United States Patent
Burry et al.

(10) Patent No.: US 9,008,370 B2
(45) Date of Patent: Apr. 14, 2015

(54) METHODS, SYSTEMS AND PROCESSOR-READABLE MEDIA FOR TRACKING HISTORY DATA UTILIZING VEHICLE AND FACIAL INFORMATION

(75) Inventors: Aaron Michael Burry, Ontario, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 292 days.

(21) Appl. No.: 13/421,319

(22) Filed: Mar. 15, 2012

(65) Prior Publication Data

US 2013/0243260 A1 Sep. 19, 2013

(51) Int. Cl.
*G06K 9/00* (2006.01)
*G06Q 30/02* (2012.01)

(52) U.S. Cl.
CPC ........ G06Q 30/0202 (2013.01); G06K 9/00221 (2013.01); *G06K 2209/15* (2013.01)

(58) Field of Classification Search
CPC ........................................................ G06K 9/00
USPC ........................................................ 382/105
See application file for complete search history.

(56) References Cited

U.S. PATENT DOCUMENTS

| | | | |
|---|---|---|---|
| 7,188,076 B2 | 3/2007 | Bensemana | |
| 7,519,200 B2* | 4/2009 | Gokturk et al. | 382/118 |
| 7,796,029 B2 | 9/2010 | Ma et al. | |
| 7,974,869 B1 | 7/2011 | Sharma et al. | |
| 2003/0161513 A1* | 8/2003 | Drukker et al. | 382/128 |
| 2004/0059571 A1* | 3/2004 | Ohtomo | 704/226 |
| 2004/0254837 A1 | 12/2004 | Roshkoff | |
| 2004/0260513 A1* | 12/2004 | Fitzpatrick et al. | 702/182 |
| 2004/0263621 A1* | 12/2004 | Guo et al. | 348/143 |
| 2008/0249837 A1 | 10/2008 | Angell et al. | |
| 2008/0249867 A1 | 10/2008 | Angell et al. | |
| 2008/0270231 A1 | 10/2008 | Li et al. | |
| 2009/0089107 A1* | 4/2009 | Angell et al. | 705/7 |
| 2009/0182630 A1* | 7/2009 | Otto et al. | 705/14 |
| 2010/0086175 A1* | 4/2010 | Yokono et al. | 382/103 |
| 2010/0128931 A1* | 5/2010 | Bongard | 382/105 |
| 2012/0007983 A1* | 1/2012 | Welch | 348/148 |
| 2012/0026335 A1* | 2/2012 | Brown et al. | 348/159 |
| 2012/0246007 A1* | 9/2012 | Williams et al. | 705/14.66 |
| 2013/0113936 A1* | 5/2013 | Cohen et al. | 348/148 |

OTHER PUBLICATIONS

Gilmore, W. et al., "Behavioral Marketing Using Biometrics" http://behavioraltargeting.biz/behavioral-marketing-using-biometrics/Summary, May 19, 2010, 5 pages.
Ryoo, M. S. et al., "Video Scene Analysis of Interactions between Humans and Vehicles Using Event Context," *CIVR* (2010), Jul. 5-7, Xi'an, China, pp. 462-469.

* cited by examiner

*Primary Examiner* — Stephen R Koziol
*Assistant Examiner* — Delomia Gilliard
(74) *Attorney, Agent, or Firm* — Luis M. Ortiz; Kermit D. Lopez; Kevin Soules

(57) ABSTRACT

A method and system for tracking a customer history data utilizing a combination of vehicle and facial information. A license plate image with respect to a customer vehicle can be captured and information with respect to the license plate obtained. The license plate information can be employed as an unique customer identifier with respect to customer history data, if the customer places an order (e.g., drive-through service). Facial images of the customer upon entry to a store and/or upon checkout can be captured and processed. The checkout image can be matched against a set of images in order to associate customer order information with customer history data identified from the license plate information for tracking an in-store order transaction.

20 Claims, 6 Drawing Sheets

METHODS, SYSTEMS AND PROCESSOR-READABLE MEDIA FOR TRACKING HISTORY DATA UTILIZING VEHICLE AND FACIAL INFORMATION

TECHNICAL FIELD

Embodiments are generally related to data-processing systems. Embodiments are also related to data collection methods, systems and processor-readable media. Embodiments are also related to license plate and facial recognition techniques. Embodiments are additionally related to the acquisition of customer history data utilizing vehicle and facial information.

BACKGROUND OF THE INVENTION

Customer data collection systems can perform various inventory control and ordering functions in a variety of environments such as, for example, grocery stores, department stores, and enterprises involving the manufacturing and supply of parts. Tracking the behavior of a repeat customer is of strong interest in a retail application. For example, in a quick service restaurant a customer menu choice can be tracked so that "suggestive selling" can be enabled by offering a product that the customer has ordered in the past based on a history of his or her particular orders.

Several approaches have been proposed to gather customer history data. In one approach, customer history data can be gathered by offering a bonus card and/or a loyalty program (e.g. a shopper's club card). A problem associated with such an approach is that clientele might not wish to enroll in the loyalty program in some retail situations. In another approach, customer information across visits can be tracked by tying an order information with respect to a customer's credit card data. The credit card information can be employed as a unique customer identifier to associate the customer's order information over a time period. Such an approach, however, is not possible for quick service (e.g., McDonald's) type environments, where most customers pay in cash. Another technique involves the use of facial recognition technologies to identify an individual customer across multiple visits and/or store locations. Such facial recognition techniques provide an unconstrained matching problem and due to differences in noise factors such as, for example, lighting and customer attire, such an approach is unable to accurately recognize the facial features.

Based on the foregoing, it is believed that a need exists for an improved system and method for tracking a customer history data, solutions for which will be described in greater detailed herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved customer data collection methods, systems and processor-readable media.

It is another aspect of the disclosed embodiments to provide for improved methods, systems and processor-readble media for tracking customer history data utilizing vehicle and facial information.

It is a further aspect of the disclosed embodiments to provide for improved license plate and facial recognition techniques.

The aforementioned aspects and other objectives and advantages can now be achieved as described herein. A system and method for tracking a customer history data utilizing vehicle and facial information is disclosed herein. A license plate image with respect to a customer vehicle can be captured by an image-capturing unit and information with respect to the license plate can be obtained utilizing a license plate recognition technology. The license plate information can be employed as a unique customer identifier with respect to the customer history data stored in a database if the customer placed an order through a drive-through service. Facial images of the customer upon entry to a store and upon checkout can be captured by the image-capturing unit and processed utilizing a facial recognition technology. The checkout image can be matched against a set of images of customers who entered the store in order to associate a customer's order information with the customer history data identified from the license plate information for tracking an in-store order transaction.

In one embodiment, the license plate recognition can be performed as a vehicle enters a lot. The unique customer identifier can be generated based on the license plate information. If the customer is a drive-through customer, then the customer places an order and the order information can be associated with the customer history data identified from the license plate information. The license plate information is sufficient to associate the order information and properly store the data for the customer record. Otherwise, the customer from the vehicle to the store entry can be tracked. The facial image of the customer at entry can be obtained and the facial image can be associated with the unique customer identifier. The facial image can be added to a queue of the customers waiting to order.

In another embodiment, the image of the customer can be acquired before the customer places an order if the customer is approaching a cash register. The facial image can be matched against the set of images for the customers entering the store. If a high confidence match is found, the order information can be associated with the customer history data identified from the license plate information and the store-entry image for the customer can be removed from the queue. If the high confidence match is not found, the store-entry images from the queue that are older than a time period can be purged and the order information and images can be stored for manual review. The degree of difficulty of the face matching/recognition problem can be reduced substantially as there is only a limited set of candidate faces in the "pool" to be matched. The two facial images of the customer can be taken on the same day with similar lighting and attire and a forward facing pose. The parameters of the facial recognition can be tuned to bias towards a lower yield and extremely high accuracy results.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
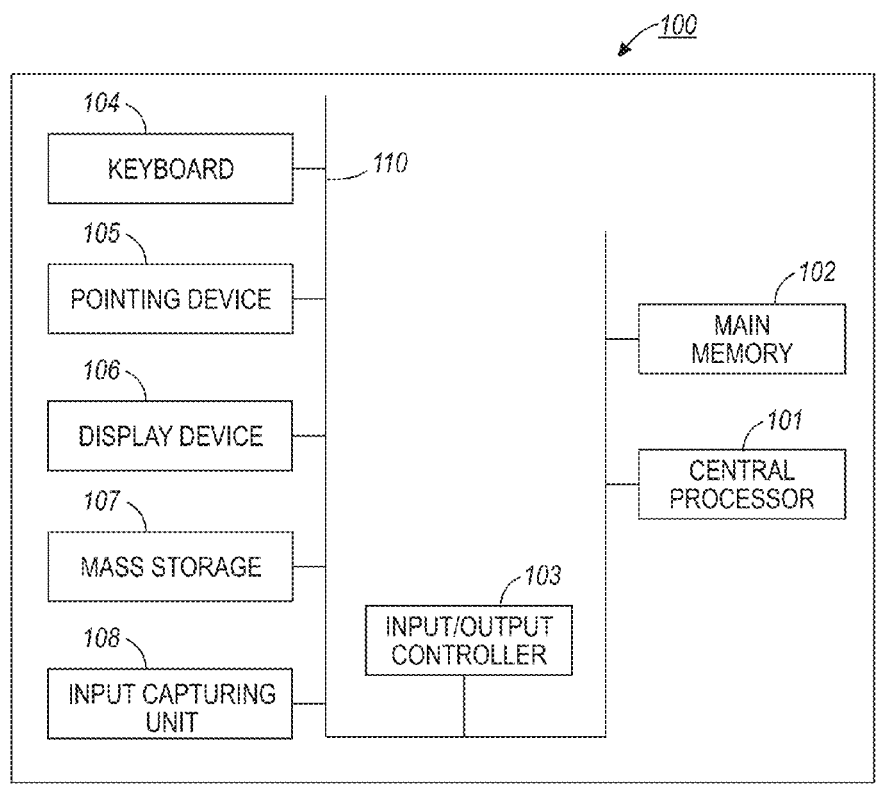
FIG. 1 illustrates a schematic view of a computer system, in accordance with the disclosed embodiments.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

The computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
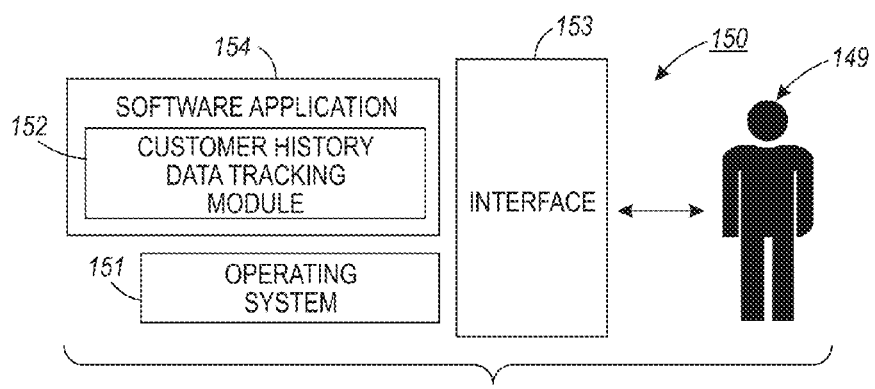
FIG. 2 illustrates a schematic view of a software system including a customer history data tracking module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a central processor 101, a main memory 102, an input/output controller 103, a keyboard 104, an input device 105 (e.g., a pointing device such as a mouse, track ball, and pen device, etc.), a display device 106, a mass storage 107 (e.g., a hard disk), an image-capturing unit 108, and a USB (Universal Serial Bus) peripheral connection. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc. System 100 therefore includes at least one procesor 101 and at least one data bus 110 coupled to the processor(s) 101. System 100 also includes a computer-usable medium embodying computer code, the computer-usable medium being coupled to the data bus 110, the computer program code comprising instructions executable by the processor(s) 101, and configured for performing instructions, steps, methods, and/or processes as discused further herein.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system 151 and/or software application 154.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), also serves to display results, whereupon the user may supply additional inputs or terminate the session. In an embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. The software application 154 can include a tracking customer history data tracking module 152 for tracking customer history data utilizing a combination of vehicle and facial information. Software application 154, on the other hand, can include instructions such as the various operations described herein with respect to the various components and modules described herein such as, for example, the methods 600 and 700 depicted in FIGS. 6-7.

FIGS. 1-2 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, UNIX, LINUX, and the like.

Figure 3:
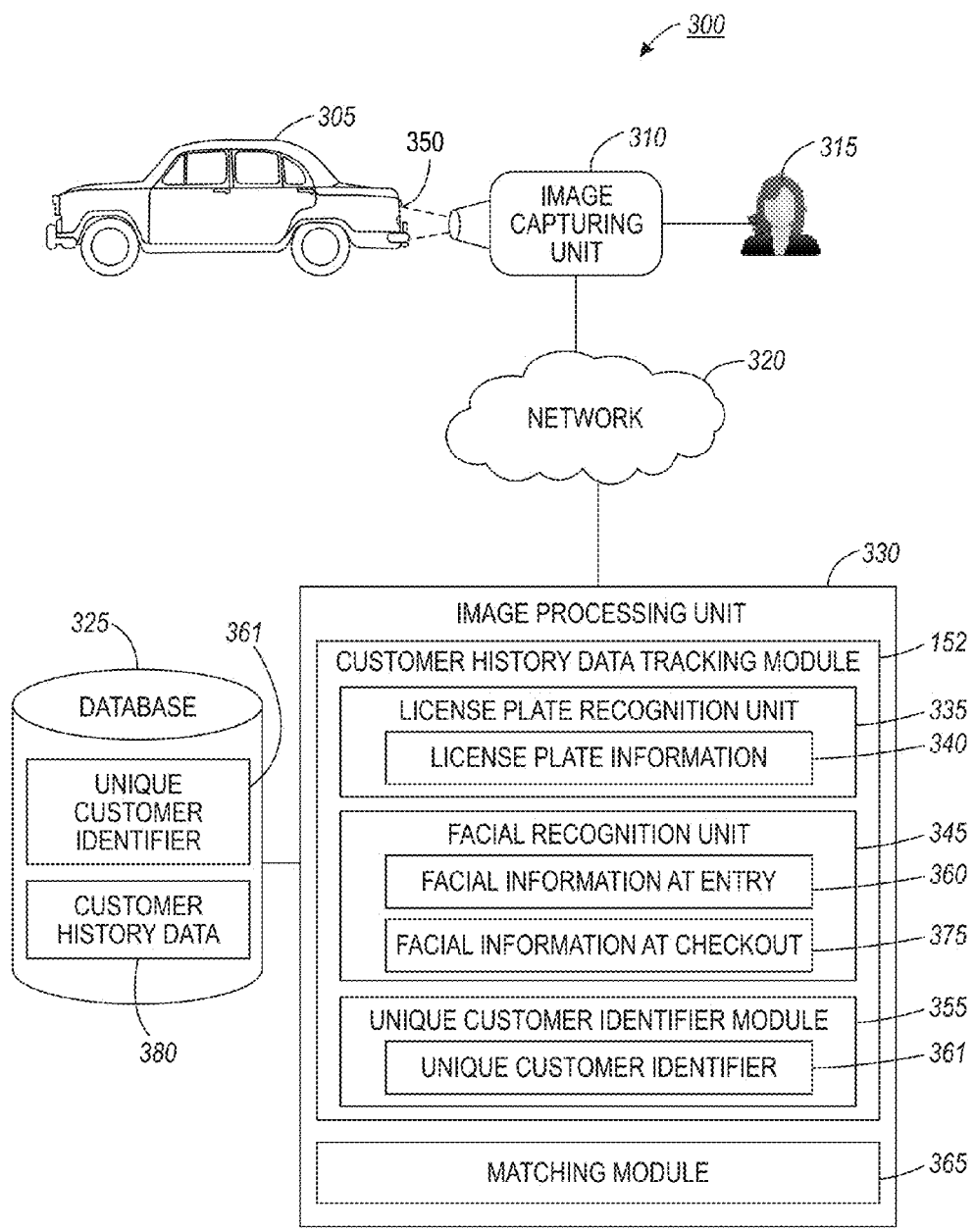
FIG. 3 illustrates a block diagram of a customer history data tracking system, in accordance with the disclosed embodiments.

FIG. 3 illustrates a block diagram of a customer history data tracking system 300 that can be implemented in accordance with the disclosed embodiments. Note that in FIGS. 1-7, identical or similar blocks are generally indicated by identical reference numerals. As shown in FIG. 3, the customer history data tracking system 300 generally can include an image-capturing unit 310 (e.g., camera, video camera, digital video cameras, etc.) for capturing an image of a vehicle 305 and a facial image of a driver 315 (e.g., customer) within an effective field of view. The image-capturing unit 310 provides an image of a license plate 350 mounted on the rear of the vehicle 305. Note that the customer history data tracking system 300 is capable of reading the license plate on the front of the vehicle 305 as well as the rear. The image-capturing unit 310 can be operatively connected to an image processing unit 330 via a network 320. Note that the image-capturing unit 310 described in greater detail herein are analogous or similar to the image-capturing unit 108 of the data-processing system 100, depicted in FIG. 1. The image-capturing unit 310 may include built-in integrated functions such as image processing, data formatting, and data compression functions.

Note that the network 320 may employ any network topology, transmission medium, or network protocol. The network 320 may include connections such as wire, wireless communication links, or fiber optic cables. Network 320 can also be, for example, the "Internet" representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The customer history data tracking system 300 further includes the image processing unit 330 to receive a captured image of the vehicle 305 and the customer 315 from the image-capturing unit 310. The image processing unit 330 is preferably a small, handheld computer device or palmtop computer as depicted in FIG. 1 that provides portability and is adapted for easy mounting. The image processing unit 330 can be configured to include the customer history data tracking module 152 for tracking the customer history data 380 utilizing a combination of vehicle information (e.g., license plate information 340) and facial information (e.g., facial information 360, 375, etc.). The customer history data-tracking module 152 further includes a license plate recognition unit 335, a facial recognition unit 345, matching module 365, and a unique customer identifier module 355.

The license plate recognition unit 335 accurately recognizes the license plate character of the vehicle 305. The unique customer identifier module 355 employs the license plate information 340 as a unique customer identifier 361 with respect to the customer history data 380 stored in a database 325 if the customer 315 places an order through a drive-through service. A drive-through, or drive-thru, is a type of service provided by a business that allows customers to purchase products without leaving their cars. Orders can be generally placed utilizing a microphone and picked up in person at the window. The customer history data 380 is based on one or more characteristics of the customer recent transactions.

The facial recognition unit 345 processes facial images of the customer 315 upon entry to a store 360 and upon checkout 375 captured by the image-capturing unit 310. The checkout image 375 can be matched against a set of images 360 of the customer 315 entering the store to associate the customer order information with the customer history data 380 identified from the license plate information 340 for tracking an in-store order transaction. In an in-store order transaction, the product can be distributed to customers within a store. It can be appreciated that the license plate recognition unit 335 and the facial recognition unit 345 can be implemented as software modules.

Figure 4:
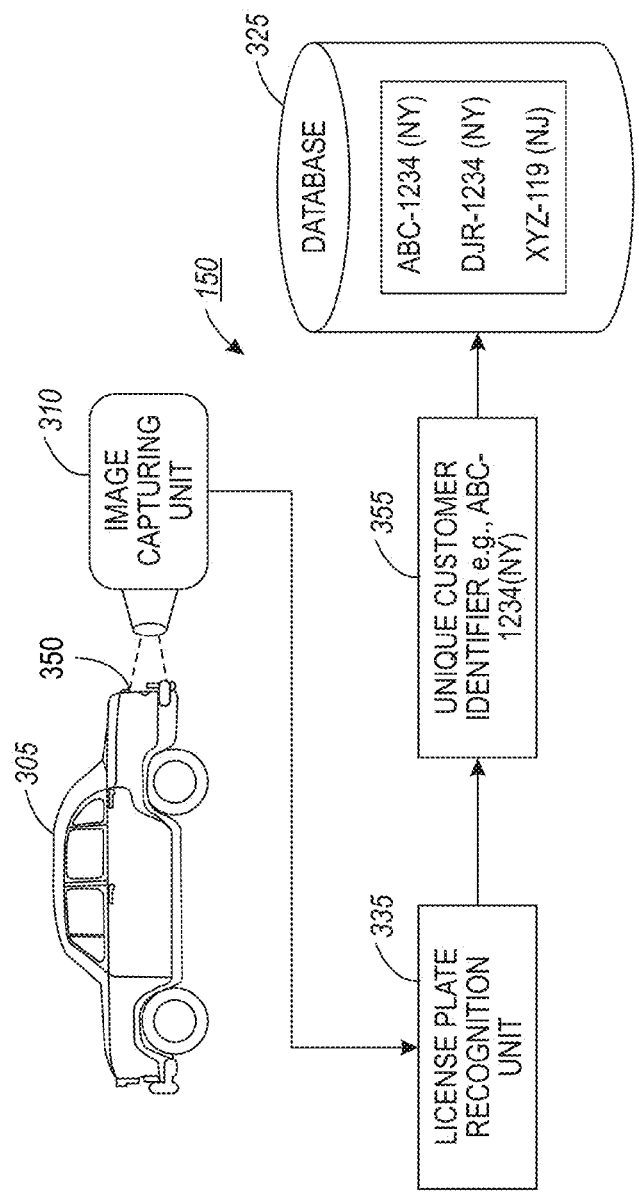
FIG. 4 illustrates a flow diagram for tracking customer history data utilizing vehicle information with respect to a customer if the customer places an order through a drive-through service, in accordance with the disclosed embodiments.

FIG. 4 illustrates a flow diagram for tracking the customer history data 380 utilizing the license plate information 340 of the customer 315 if the customer 315 places an order through the drive-through service, in accordance with the disclosed embodiments. The image-capturing unit 310 captures the license plate image with respect to the customer vehicle 305 and obtains information 340 with respect to the license plate utilizing the license plate recognition unit 335. The license plate recognition unit 335 is a mass surveillance method that utilizes optical character recognition on images to read the license plates on vehicles.

The unique customer identifier module 355 utilizes the license plate information 340 as the unique customer identifier 361 with respect to the customer history data 380 stored in the database 325. For a quick service restaurant application, if the customer 315 orders through the drive-through service, then the license plate information 340 is sufficient to associate the order information and properly store the data for the customer record. The customer history data 380 can be entered into the database 325, for example, each time the customer makes a purchase at the store.

Figure 5:
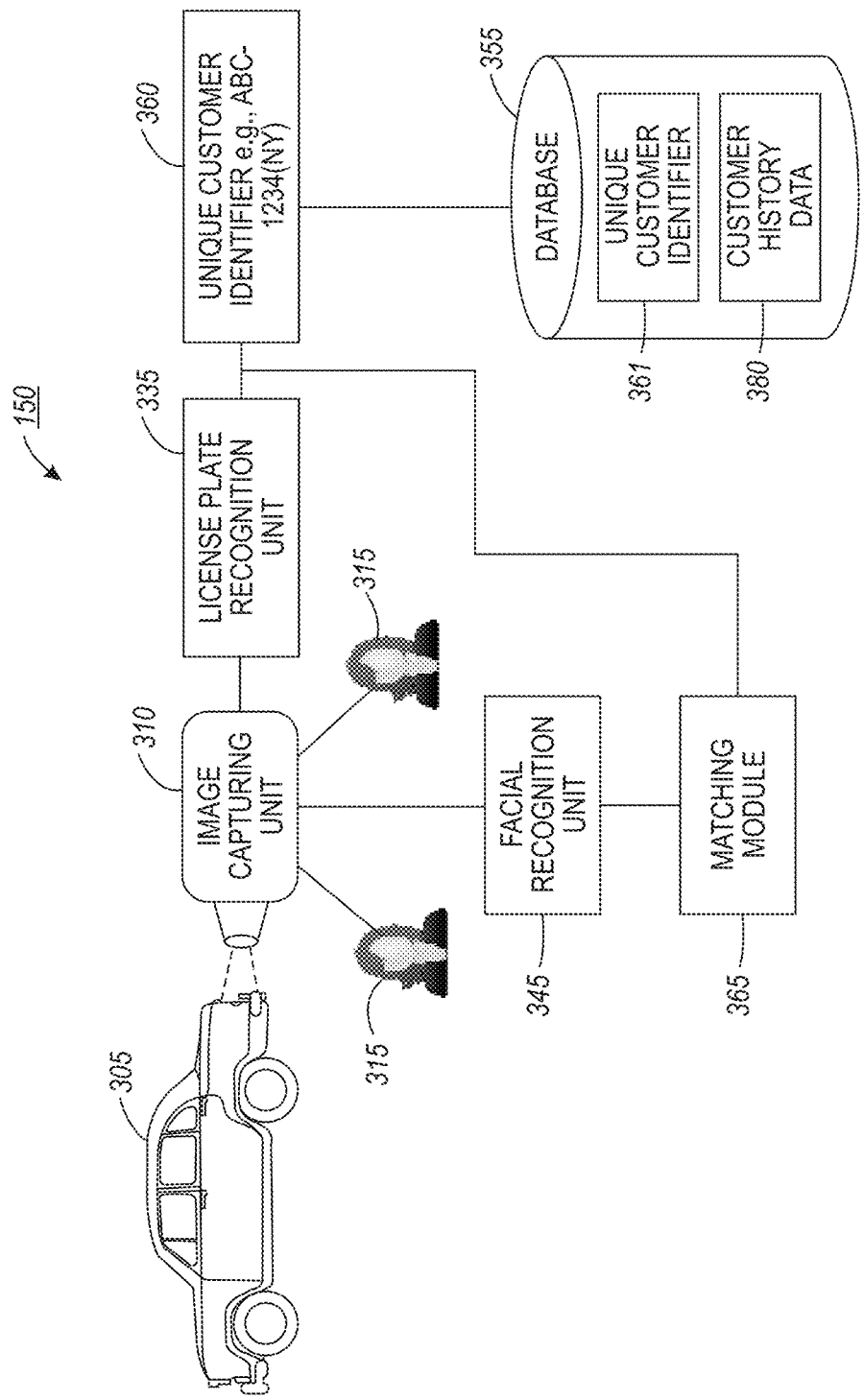
FIG. 5 illustrates a flow diagram for tracking the customer history data utilizing the vehicle information and facial information with respect to the customer for tracking an in-store order transaction, in accordance with the disclosed embodiments.

FIG. 5 illustrates a flow diagram for tracking the customer history data 380 utilizing the license plate information 340 and the facial information 360 and 375 of the customer 315 for the in-store order transaction, in accordance with the disclosed embodiments. The image-capturing unit 310 captures facial image of the customer 315 upon entry to the store and at checkout. The facial recognition unit 345 processes the images to obtain facial information at entry 360 and at checkout 375. The facial recognition unit 345 is a computer application for automatically identifying or verifying a person from a digital image or a video frame from a video source. The selected facial features from the image can be compared with a facial database. The matching module 365 matches the order entry image 375 against a set of images of the customers 315 entering the store to associate the customer order information and the vehicle license plate 340 as the unique customer identifier 361. Such an approach enables the customer order association with substantially reduced performance requirements on the facial recognition technology.

Figure 6:
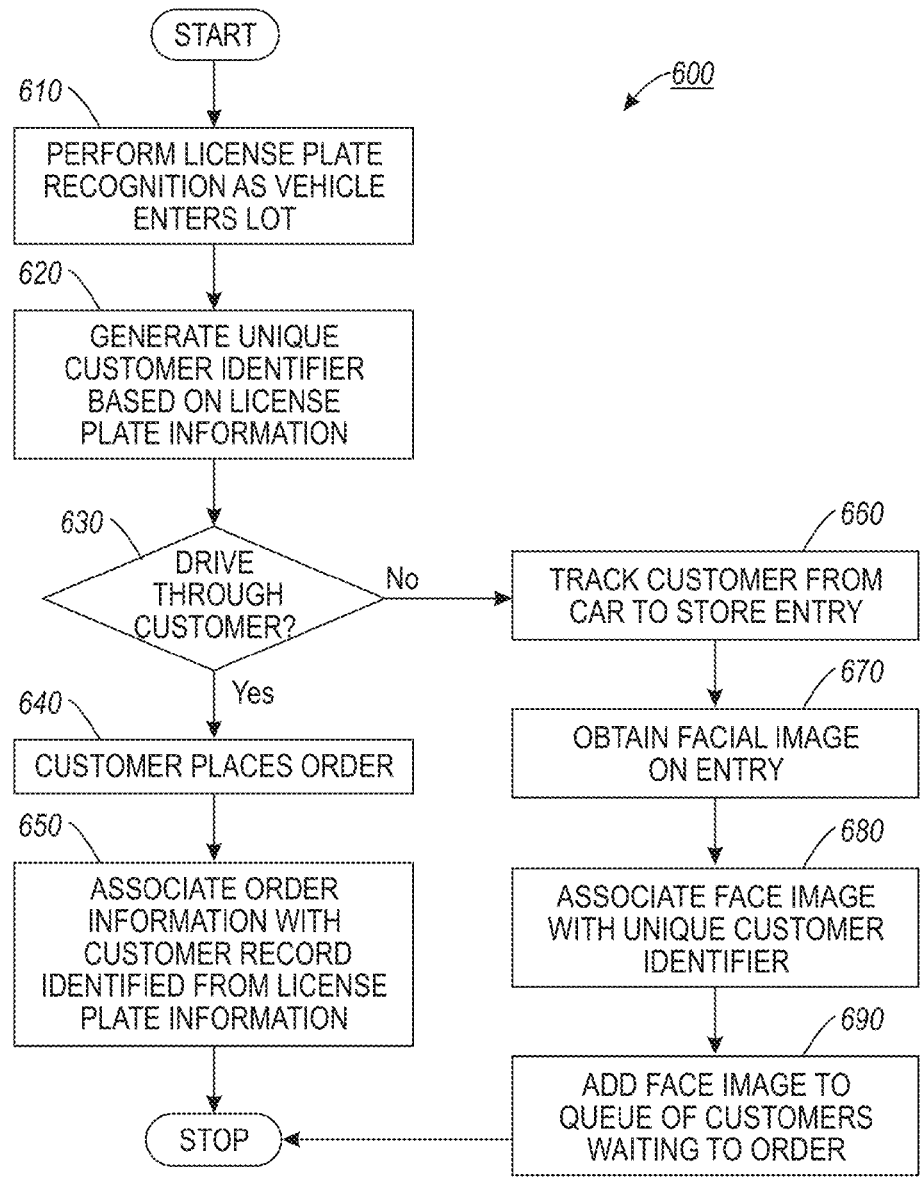
FIG. 6 illustrates a high level flow chart of operations illustrating logical operational steps of a method for tracking the customer history data utilizing the vehicle information with respect to the customer, in accordance with the disclosed embodiments.

FIG. 6 illustrates a high level flow chart of operations illustrating logical operational steps of a method 600 for tracking the customer history data 380 utilizing the license plate information 340 of the customer 315, in accordance with the disclosed embodiments. It can be appreciated that the logical operational steps shown in FIGS. 6-7 can be implemented or provided via, for example, a module such as module 154 shown in FIG. 2 and can be processed via a processor such as, for example, the processor 101 shown in FIG. 1. Initially, as indicated at block 610, the license plate recognition can be performed as the vehicle 305 enters a lot. The unique customer identifier 361 can be generated based on the license plate information 340, as shown at block 620.

A determination can be made whether the customer 315 is a drive-through customer, as illustrated at block 630. If the customer 315 is a drive-through customer, then the customer 315 places order, as shown at block 640. Thereafter, as depicted at block 650, the order information can be associated with the customer history data 380 identified from the license plate information 340. Otherwise, the customer 315 from the vehicle 305 to the store entry can be tracked, as illustrated at block 660. Next, as indicated at blocks 670 and 680, the facial image of the customer 315 at entry can be obtained and the facial image can be associated with the unique customer identifier 361. The facial image can be added to the queue of the customer waiting to order, as depicted at block 690.

Figure 7:
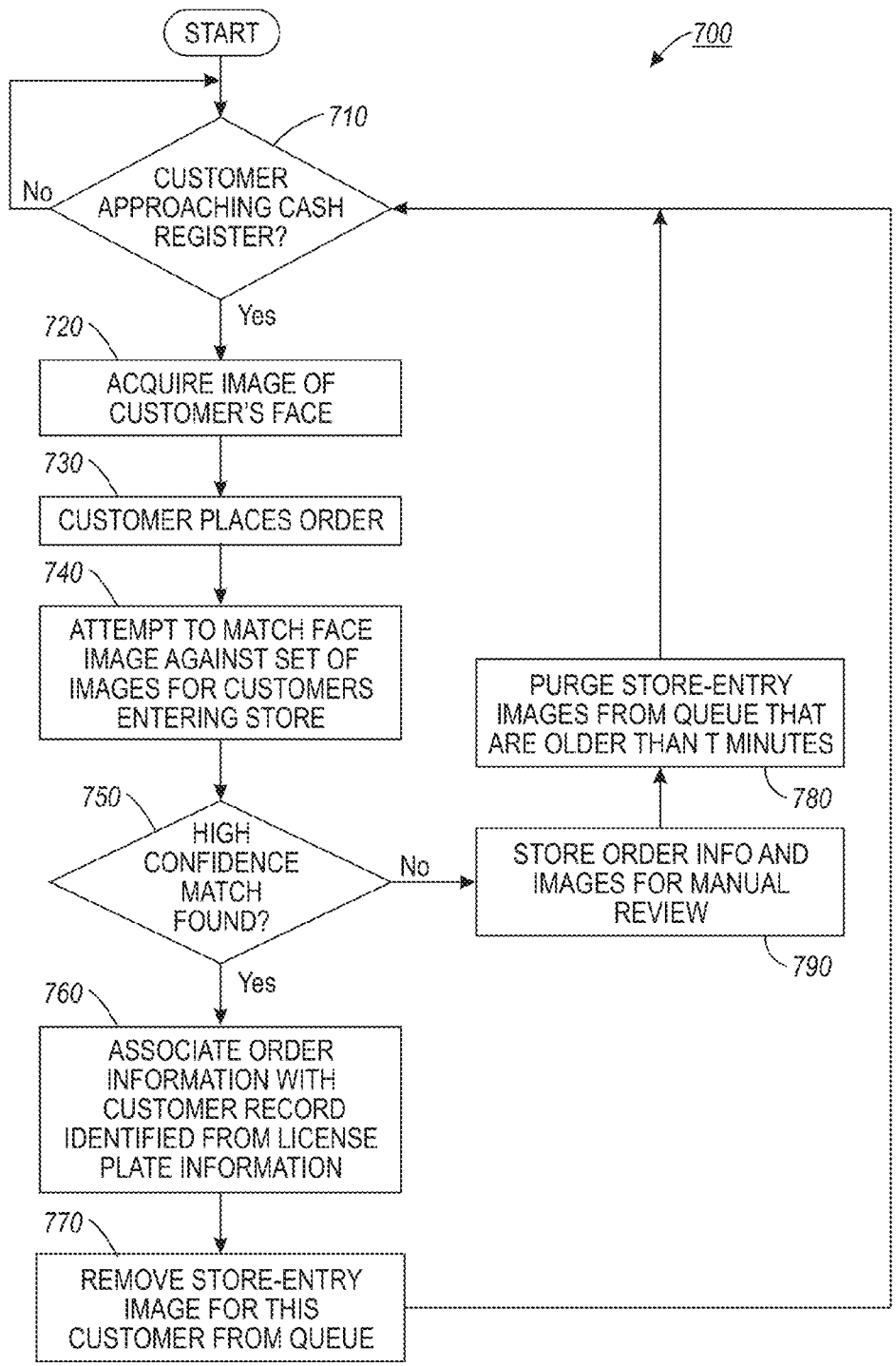
FIG. 7 illustrates a high level flow chart of operations illustrating logical operational steps of a method for tracking customer history data utilizing the vehicle information and facial information with respect to the customer, in accordance with the disclosed embodiments.

FIG. 7 illustrates a high level flow chart of operations illustrating logical operational steps of a method 700 for tracking the customer history data 380 utilizing the license plate information 340 and the facial information 360 and 375 of the customer 315, in accordance with the disclosed embodiments. Initially, a determination can be made whether the customer 315 is approaching the cash register, as illustrated at block 710. If the customer 315 is approaching the cash register, the image of the customer 315 can be acquired before the customer places an order, as indicated at blocks 720 and 730. The facial image 375 can be matched against a set of images for customers entering the store 360, as shown at block 740.

A determination can be made whether a high confidence match is found, as illustrated at block 750. If a high confidence match is found, the order information can be associated with the customer history data identified from the license plate information 340, as depicted at block 760. Thereafter, as shown at block 770, the store-entry image for the customer 315 can be removed from the queue. If a high confidence match is not found, the store-entry images 360 from queue that are older than T minutes can be purged, as depicted at block 780. Thereafter, as shown at block 790, the order information and the images 350 can be stored for manual review.

The video tracking and facial recognition 345 can be employed to relate customer order information to the license plate data 340 for the in-store order transaction. The degree of difficulty of the face matching/recognition problem can be reduced substantially as there is only a limited set of candidate faces in the "pool" to be matched. The two facial images 360 and 375 of the customer 315 can be taken on the same day with similar lighting and attire and a forward facing pose. The parameters of the facial recognition can be tuned to bias towards lower yield, but extremely high accuracy results.

Based on the foregoing, it can be appreciated that a variety of embodiments are disclosed herein, preferred and alternative. For example, in an embodiment, a method can be implemented for tracking customer history data. Such a method can include, for example, capturing a license plate image with respect to a customer vehicle and a facial image with respect to a customer in order to obtain license plate information and facial information; and applying the license plate information in association with the facial information as a unique customer identifier with respect to a customer history data stored in a database, if the customer places an order through at least one transaction approach.

In another embodiment, the step of capturing a license plate image with respect to a customer vehicle and a facial image with respect to a customer in order to obtain license plate information and facial information can further include capturing the license plate image with respect to the customer vehicle and the facial image with respect to the customer utilizing an image-capturing unit. In still other embodiments, the at least one transaction approach can comprise, for example, a drive-through service, an in-store order transaction, etc.

In yet another embodiment, a step can be provided for performing a license plate recognition operation as the customer vehicle enters a lot in order to thereafter generate the unique customer identifier based on the license plate information. In still another embodiment, steps can be provided for placing an order by the customer and associating order information with the customer history data identified from the license plate information. In another embodiment, steps can be implemented for tracking the customer from the customer vehicle to a store entry in order to thereafter obtain a facial image of the customer upon entry to the store, and associating the facial image with the unique customer identifier and adding the facial image to a queue of the customer waiting to place an order.

In another embodiment, steps can be provided for acquiring an image of the customer before the customer places the order if the customer is approaching a cash register and matching the facial image against the facial image of the customer at entry; associating the order information with the customer history data identified from the license plate information and removing the facial image of the customer at entry from a queue if a high confidence match is found; and purging the facial image of the customer at entry from queue that is older than a time period and storing the order information and the facial image for manual review if a high confidence match is not found.

In yet another embodiment, steps can be implemented for obtaining the facial image at entry and the facial image at checkout on a similar day with a similar lighting and attire and a forward facing pose. In other embodiments, a step can be implemented for tuning a parameter of the facial recognition to bias towards a lower yield and a high accuracy result. In yet other embodiments, a step can be implemented for processing the license plate image utilizing a license plate recognition technology. In another embodiment, a step can be provided for processing the facial image utilizing a facial recognition technology.

In another embodiment, a system for tracking customer history data can include, for example, a processor and a data bus coupled to the processor. Such a system can further include a computer-usable medium embodying computer code, the computer-usable medium being coupled to the data bus. Such computer program code can include instructions executable by the processor and configured for, for example, capturing a license plate image with respect to a customer vehicle and a facial image with respect to a customer in order to obtain license plate information and facial information; and applying the license plate information in association with the facial information as a unique customer identifier with respect to a customer history data stored in a database, if the customer places an order through at least one transaction approach.

In yet another embodiment, the aforementioned instructions for capturing a license plate image with respect to a customer vehicle and a facial image with respect to a customer in order to obtain license plate information and facial information can further include instructions for capturing the license plate image with respect to the customer vehicle and the facial image with respect to the customer utilizing an image-capturing unit. In still another embodiment, such instructions can be further configured for performing a license plate recognition operation as the customer vehicle enters a lot in order to thereafter generate the unique customer identifier based on the license plate information.

In another embodiment, such instructions can be further configured for tracking the customer from said vehicle to a store entry in order to thereafter obtain a facial image of the customer upon entry to the store; and associating the facial image with the unique customer identifier and adding the facial image to a queue of the customer waiting to place an order.

In still another embodiment, such instructions can be further configured for acquiring an image of the customer before the customer places the order if the customer is approaching a cash register and matching the facial image against the facial image of the customer at entry; associating the order information with the customer history data identified from the license plate information and removing the facial image of the customer at entry from a queue if a high confidence match is found; and purging the facial image of the customer at entry from a queue that is older than a time period and storing the order information and the facial image for manual review if a high confidence match is not found.

In another embodiment, such instructions can be configured for obtaining the facial image at entry and the facial image at checkout on a similar day with a similar lighting and attire and a forward facing pose. In yet another embodiment, such instructions can be further configured tuning a parameter of the facial recognition to bias towards a lower yield and a high accuracy result.

In still another embodiment, a processor-readable medium storing code representing instructions to cause a process to perform a process to track customer story data can be implemented. Such code can comprise code to: capture a license plate image with respect to a customer vehicle and a facial image with respect to a customer in order to obtain license plate information and facial information; and apply the license plate information in association with the facial information as a unique customer identifier with respect to a customer history data stored in a database, if the customer places an order through at least one transaction approach.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for tracking customer history data, said method comprising:
   capturing a license plate image with respect to a customer vehicle in order to obtain license plate information;
   generating a unique customer identifier record according to said license plate information;
   capturing a first facial image with respect to a customer in order to obtain facial information;
   matching said license plate information and said facial information;
   capturing a second facial image with respect to said customer as said customer approaches a checkout;

matching said second facial image with said first facial image in order to associate said customer's order information with said facial information; and associating said unique customer identifier record with said customer's order information; and storing said customer history data comprising said customer's order information and said associated unique customer identifier record in a database, when said customer places an order through at least one transaction approach.

2. The method of claim 1 wherein capturing a license plate image with respect to a customer vehicle and a facial image with respect to a customer in order to obtain license plate information and facial information, further comprises:

capturing said license plate image with respect to said customer vehicle and said facial image with respect to said customer utilizing a digital video camera.

3. The method of claim 1 wherein said at least one transaction approach comprises a drive-through service wherein said drive through service comprises placing an order using a microphone and receiving said order at a drive up window such that a customer is not required to leave a vehicle.

4. The method of claim 1 wherein said at least one transaction approach comprises an in-store order transaction.

5. The method of claim 3 further comprising:

performing a license plate recognition operation as said customer vehicle enters a lot in order to thereafter generate said unique customer identifier based on said license plate information.

6. The method of claim 5 further comprising:

placing an order by said customer; and associating order information with said customer history data identified from said license plate information.

7. The method of claim 4 further comprising:

tracking said customer from said customer vehicle to a store entry in order to thereafter obtain a facial image of said customer upon entry to said store; and associating said facial image and said license plate information with said unique customer identifier; and adding said facial image obtained upon said customer's entry to said store to a queue of customers waiting to place an order.

8. The method of claim 7 further comprising:

acquiring an image of said customer before said customer places said order if said customer is approaching a cash register and matching said facial image against said facial image of said customer at entry;

associating said order information with said customer history data identified from said license plate information and removing said facial image of said customer at entry from a queue if a high confidence match is found; and purging said facial image of said customer at entry from a queue that is older than a time period; and storing said order information and said facial image for manual review if a high confidence match is not found.

9. The method of claim 8 further comprising obtaining said facial image at entry and said facial image at checkout on a similar day with a similar lighting and attire and a forward facing pose.

10. The method of claim 1 further comprising tuning a parameter of said facial recognition to bias towards a lower yield and a high accuracy result.

11. The method of claim 1 further comprising processing said license plate image utilizing a license plate recognition technology comprising employing an optical character recognition on vehicle license plates.

12. The method of claim 1 further comprising processing said facial image utilizing a facial recognition technology.

13. A system for tracking customer history data, said system comprising:

a processor;

a data bus coupled to said processor; and a non-transitory computer-usable medium embodying computer code, said computer-usable medium being coupled to said data bus, said computer program code comprising instructions executable by said processor and configured for:

capturing a license plate image with respect to a customer vehicle in order to obtain license plate information;

generating a unique customer identifier record according to said license plate information;

capturing a first facial image with respect to a customer in order to obtain facial information;

matching said license plate information and said facial information;

capturing a second facial image with respect to said customer as said customer approaches a checkout;

matching said second facial image with said first facial image in order to associate said customer's order information with said facial information;

associating said unique customer identifier record with said customer's order information; and storing said customer history data comprising said customer's order information and said associated unique customer identifier record in a database, when said customer places an order through at least one transaction approach.

14. The system of claim 13 wherein said instructions for capturing a license plate image with respect to a customer vehicle and a facial image with respect to a customer in order to obtain license plate information and facial information, further comprises:

instructions for capturing said license plate image with respect to said customer vehicle and said facial image with respect to said customer utilizing a digital video camera.

15. The system of claim 13 wherein said instructions are further configured for performing a license plate recognition operation as said customer vehicle enters a lot in order to thereafter generate said unique customer identifier based on said license plate information.

16. The system of claim 14 wherein said instructions are further configured for:

tracking said customer from said vehicle to a store entry in order to thereafter obtain a facial image of said customer upon entry to said store; and associating said facial image with said unique customer identifier and adding said facial image to a queue of said customer waiting to place an order.

17. The system of claim 16 wherein said instructions are further configured for:

acquiring an image of said customer before said customer places said order if said customer is approaching a cash register and matching said facial image against said facial image of said customer at entry;

associating said order information with said customer history data identified from said license plate information and removing said facial image of said customer at entry from a queue if a high confidence match is found; and purging said facial image of said customer at entry from a queue that is older than a time period; and storing said order information and said facial image for manual review if a high confidence match is not found.

18. The system of claim 17 wherein said instructions are further configured for obtaining said facial image at entry and said facial image at checkout on a similar day with a similar lighting and attire and a forward facing pose.

19. The system of claim 13 wherein said instructions are further configured tuning a parameter of said facial recognition to bias towards a lower yield and a high accuracy result.

20. A non-transitory processor-readable medium storing code representing instructions to cause a process to perform a process to track customer history data, said code comprising code to:
   capture a license plate image with respect to a customer vehicle in order to obtain license plate information;
   generating a unique customer identifier record according to said license plate information;
   capture a first facial image with respect to a customer in order to obtain facial information;
   match said license plate information and said facial information using a matching module;
   capture a second facial image with respect to said customer as said customer approaches a checkout;
   match said second facial image with said first facial image in order to associate said customer's order information with said facial information;
   associating said unique customer identifier record with said customer's order information; and
   storing said customer history data comprising said customer's order information and said associated unique customer identifier record in a database, when said customer places an order through at least one transaction approach.

* * * * *